(12) United States Patent
Shah et al.

(10) Patent No.: US 12,074,528 B2
(45) Date of Patent: Aug. 27, 2024

(54) SECONDARY SIDE CONTROLLED QR FLYBACK CONVERTER USING A PROGRAMMABLE VALLEY ALGORITHM

(71) Applicant: Cypress Semiconductor Corporation, San Jose, CA (US)

(72) Inventors: Pulkit Shah, Bangalore (IN); Arun Khamesra, Bangalore (IN); Hariom Rai, Bangalore (IN); Aniket Shashikant Mathad, San Jose, CA (US); Kailas Narayana Iyer, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 347 days.

(21) Appl. No.: 17/575,001

(22) Filed: Jan. 13, 2022

(65) Prior Publication Data

US 2023/0223858 A1 Jul. 13, 2023

(51) Int. Cl.
*H02M 3/335* (2006.01)
*H02M 1/00* (2006.01)

(52) U.S. Cl.
CPC ..... *H02M 3/33592* (2013.01); *H02M 1/0012* (2021.05); *H02M 1/0058* (2021.05); *H02M 3/33515* (2013.01); *H02M 3/33576* (2013.01)

(58) Field of Classification Search
CPC ............. H02M 1/0012; H02M 1/0058; H02M 1/0006; H02M 3/33515; H02M 3/33576;
(Continued)

(56) References Cited

U.S. PATENT DOCUMENTS 10,651,753 B1 * 5/2020 Khamesra ......... H02M 3/33592
11,005,364 B1 * 5/2021 Radic ................ H02M 3/33523
(Continued)

FOREIGN PATENT DOCUMENTS

CN 107210678 A * 9/2017 ........ H02M 3/33592

OTHER PUBLICATIONS

Onsemi, Quasi-Resonant Flyback Controller, High Frequency, 43 pages, Nov. 2021.
(Continued)

*Primary Examiner* — Kyle J Moody
*Assistant Examiner* — Jye-June Lee

(57) ABSTRACT

A secondary-side-controller for a QR flyback converter and method for operating the same are provided. Generally, the secondary-side-controller includes a driver configured to control a power-switch (PS) on a primary side of converter to turn on the PS when a sinusoidal input voltage to the converter is at one of a plurality of valleys, an analog-to-digital-converter (ADC) to read the input voltage, output voltage, and load current, and generate digital signals based thereon. A valley-controller coupled to the driver, ADC, a look-up-table and a pulse width modulator (PWM) receives the signals from the ADC and using the look-up-table determines at which valley of the plurality of valleys to couple a PWM signal from the PWM to the driver. The valley-controller is operable for each switching cycle of the PS to increment, decrement or leave unchanged the valley at which the PWM signal is coupled from the PWM to the driver.

20 Claims, 6 Drawing Sheets

(58) Field of Classification Search
CPC ......... H02M 3/33523; H02M 3/33592; H02M 3/01; Y02B 70/10
See application file for complete search history.

(56) References Cited

U.S. PATENT DOCUMENTS

| | | | |
|---|---|---|---|
| 2021/0376734 A1* | 12/2021 | Lin | H02M 3/33515 |
| 2022/0052613 A1* | 2/2022 | Xu | H02M 3/33592 |
| 2022/0271672 A1* | 8/2022 | Radic | H02M 3/33523 |
| 2022/0352815 A1* | 11/2022 | Hsu | H02M 3/33523 |

OTHER PUBLICATIONS

Diodes Incorporated, Quasi-Resonant PWM Controller, 17 pages, Mar. 2017.

* cited by examiner

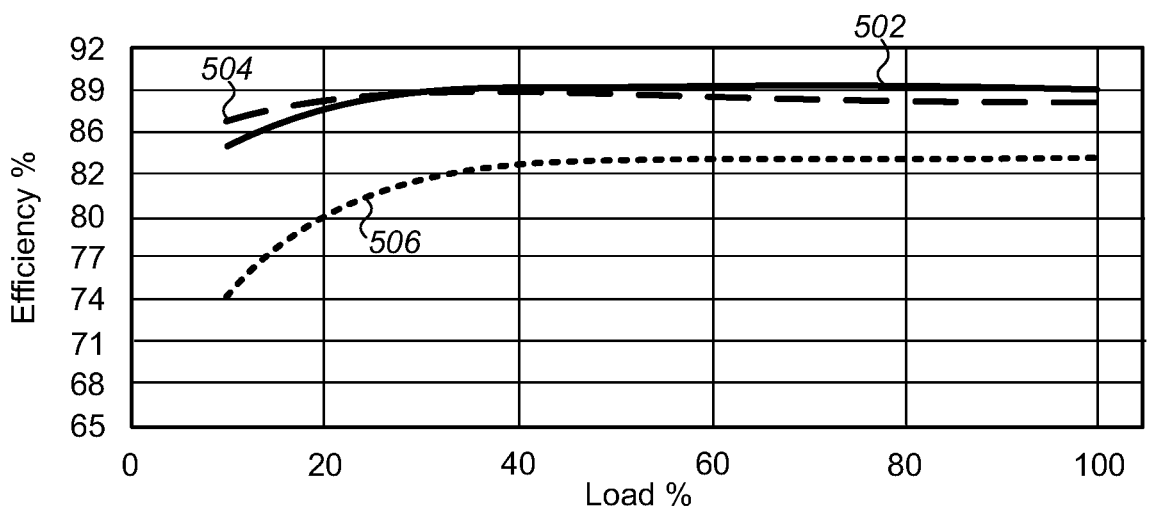
FIG. 5
(Conventional)

SECONDARY SIDE CONTROLLED QR FLYBACK CONVERTER USING A PROGRAMMABLE VALLEY ALGORITHM

TECHNICAL FIELD

This disclosure relates generally to power converters, and more particularly to secondary side controlled Quasi Resonant (QR) flyback converters and methods of operating the same.

BACKGROUND

Quasi-resonant (QR) flyback converters are designed for wide output power applications ranging from 5 W to 65 W. For example, for universal serial bus power delivery (USB-PD) applications output voltages can vary from 3.3V to 21.5V with maximum load currents of up to about 3 A. The input supply of a QR flyback converter can range from 85V-265V Root Mean Square (RMS).

FIG. 1A shows a schematic of a basic flyback converter 100 including an input capacitor 102, a transformer 104, a first rectifying element or power switch (PS), such as a metal-oxide-silicon field effect transistor (MOSFET 106), on a primary side of the transformer, a second rectifying element, such as a synchronous rectifier (SR) field effect transistor (SR_FET 108), on a secondary side of the transformer, and a primary side controller 110 coupled to a gate of the MOSFET 106, and a secondary side controller 112 coupled to a gate of the SR_FET 108 and to an output ($V_{OUT}$) of the flyback converter. Component $L_{leak}$ 114 represents a parasitic leakage inductance of the transformer 104, while $C_P$ 116 represents a total parasitic capacitance (intra-winding capacitance and stray capacitance) of the primary side of the flyback converter 100. In operation, the primary side controller 110 receives a signal from the secondary side controller 112 over a feedback or flyback path 118. During the time in which the MOSFET 106 is on or closed with SR_FET 108 being off or open, the flyback converter 100 is said to be operating in fly-back mode, and a magnetic field builds up in the transformer 104 while a current on the primary side increases linearly. When the MOSFET 106 is off or opened, and SR_FET 108 is on or closed, the flyback converter 100 transfers the power to secondary side, in which the magnetic field begins to collapse and the secondary side current decreases steadily, but gradually as power is coupled to the output (Vout) until a point is reached at which there is substantially zero current flow in the secondary side.

FIG. 1B shows a normal Vds waveform of a drain-source voltage (Vds) across the MOSFET 106 where two resonant oscillations can be observed. The higher frequency oscillation 1 happens during an initial turnoff of the MOSFET due to the leakage inductance ($L_{leak}$ 114) resonating with the parasitic capacitance ($C_P$ 116). Oscillation 2 occurs when the secondary winding energy declines to zero. During this time both windings are open, thus, the inductance of the primary side of the transformer 104, $L_P$, resonates with the capacitance at the parasitic capacitance ($C_P$ 116). Because of this resonance, Vds will experience a minimum valley point, whose minimum value will depend on a reflected voltage (VR) across primary side of the transformer 104. By causing the primary side controller 110 to turn on the MOSFET 106 at this minimum valley, the flyback converter 100 is said to be operating as a valley switching or QR flyback converter. Depending on the primary side controller 110, the MOSFET 106 can be turned on at different valley of the Vds (first, second, even up to seventh) depending on a load coupled to the output of the QR flyback converter 100. If the MOSFET 106 is operated to always turn on at the first valley point, the QR flyback converter 100 is said to be operating in a free running quasi-resonant mode. For a free running QR flyback converter 100, the frequency with the MOSFET 106 is turned on (switching frequency) is dependent on the load.

A critical parameter or figure of merit for all power converters is the efficiency at which the converters can operate across varying loads to keep power losses low and meet requirements specified by many different industry standards. In switched mode power supplies (SMPS), such as the QR flyback converter 100 described above, a significant cause of inefficiency arises from switching losses caused by a turn-on resistance of the MOSFET 106 and core losses in the transformer during switching.

One problem with previous generations of QR flyback converter converters arises from the fact that switching frequency of the converter naturally increases with decrease in load current. FIG. 1C shows the switching frequency versus load relationship for a free running QR flyback converter 100. Referring to FIG. 1C it is seen that the switching frequency is at maximum for low loads, while decreasing to a minimum load at higher loads. Thus, the increase in switching frequency with low load current causes higher power losses and a decrease in efficiency.

It is further noted that switching frequency also depends upon components (MOSFET 106, transformer 104) selected for the QR flyback converter 100, and can vary with different output power applications. Thus, designing a single chip solution for a QR flyback converter 100 capable of operating across a wide range of power delivery applications without incurring higher power losses can be difficult.

Accordingly, there is a need for a QR flyback converter and methods for operating capable of operating across a wide range of output loads at high efficiencies. There is a further need for a single chip solution for a QR flyback converter capable of operating across a wide range of input voltages, output voltages and output loads for a wide range of power delivery applications.

SUMMARY

A secondary side controller for a quasi-resonant (QR) flyback converter with programmable valley algorithm and methods of operating the same are provided for operating at high efficiencies across a wide range of input voltages, output voltages and output loads for a wide range of power delivery applications. In one embodiment, the secondary side controller includes a driver configured to control a power-switch (PS) on a primary side of the QR flyback converter, an analog to digital converter (ADC) and a valley-controller coupled to the driver, the ADC, a look-up-table and to a pulse width modulator (PWM). The driver is operable to turn on the PS when a sinusoidal input voltage to the QR flyback converter is at one of a plurality of valleys. The ADC is coupled to receive an input voltage signal, an output voltage signal, and a load current signal, and is operable to generate a number of digital signals based thereon. The valley-controller is operable to receive the digital signals from the ADC, and, based on the digital signals received, to determine from values stored in the look-up-table at which valley of the plurality of valleys to couple a PWM signal from the PWM to the driver.

Generally, the valley-controller includes an up/down-valley-controller operable to increment, decrement or leave unchanged the valley at which the PWM signal is coupled from the PWM to the driver for each switching cycle of the power switch. In some embodiments, the change in valleys is done at slow pace, and the up/down-valley-controller is operable to increment or decrement the valley at which the PWM signal is coupled from the PWM to the driver by only a single valley for each switching cycle.

In other embodiments, the secondary-side-controller further includes a pulse width counter through which the PWM is coupled to the valley-controller to detect a pulse width of the PWM signal coupled from the PWM to the driver, and the valley-controller further includes a down-valley-controller operable to, when the pulse width increases by a specified count, decrement by one or more valleys the valley at which the PWM signal is coupled from the PWM to the driver.

The up/down-valley-controller can be implemented in hardware, or in firmware using a program stored in a memory in the secondary-side-controller. The down-valley controller is preferably implemented through hardware to support quick power delivery for increased power requirement.

Also disclosed is a system including a transformer with a primary side connected to receive a sinusoidal input voltage through a power switch (PS) coupled between the input and the primary side, a secondary side coupled to an output port, a primary-side-controller operable to control the PS, and a secondary-side-controller. The secondary-side-controller includes a driver configured to control the primary-side-controller, an analog to digital converter (ADC), and a valley-controller coupled to the driver, the ADC, a look-up-table and to a pulse width modulator (PWM). The driver is operable to provide a drive signal to the primary-side-controller to turn on the PS when the sinusoidal input voltage is at one of a plurality of valleys. The ADC is operable to receive an input voltage signal, an output voltage signal, and a load current signal, and to generate a number of digital signals based thereon. The valley-controller is operable to receive the digital signals from the ADC, and, based on the digital signals received, determine from values stored in the look-up-table at which valley of the plurality of valleys to couple a PWM signal from the PWM to the driver. The output port can include a Universal Serial Bus type C (USB-C) compatible connector.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIG. 5 is a graph of efficiency versus load for a QR flyback converter operated in a conventional manner.

DETAILED DESCRIPTION

Secondary-side controlled quasi-resonant (QR) flyback converters and methods of operating the same are disclosed for improving efficiency across a wide range of loads and power delivery applications. The system and methods of the present disclosure are particularly useful in Universal Serial Bus Power Delivery (USB-PD) applications with wide output power applications ranging from 5 W to 65 W, and output voltages from 3.3V to 21.5V.

A QR flyback converter is a discontinuous-conduction mode (DCM) flyback converter having a valley switching turn-on. It is also known as variable frequency or valley switching flyback converter and is largely used in low power switched mode power supply (SMPS) application such as charger, adapter and auxiliary supply.

Figure 1A:
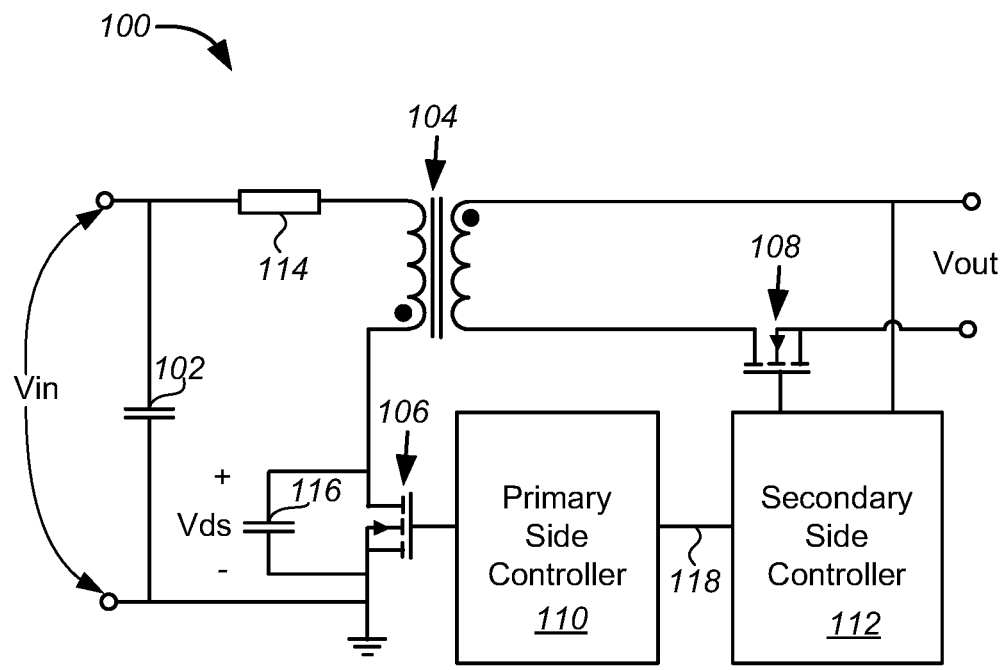
FIG. 1A is a simplified schematic block diagram illustrating a conventional flyback converter.
Figure 1B:
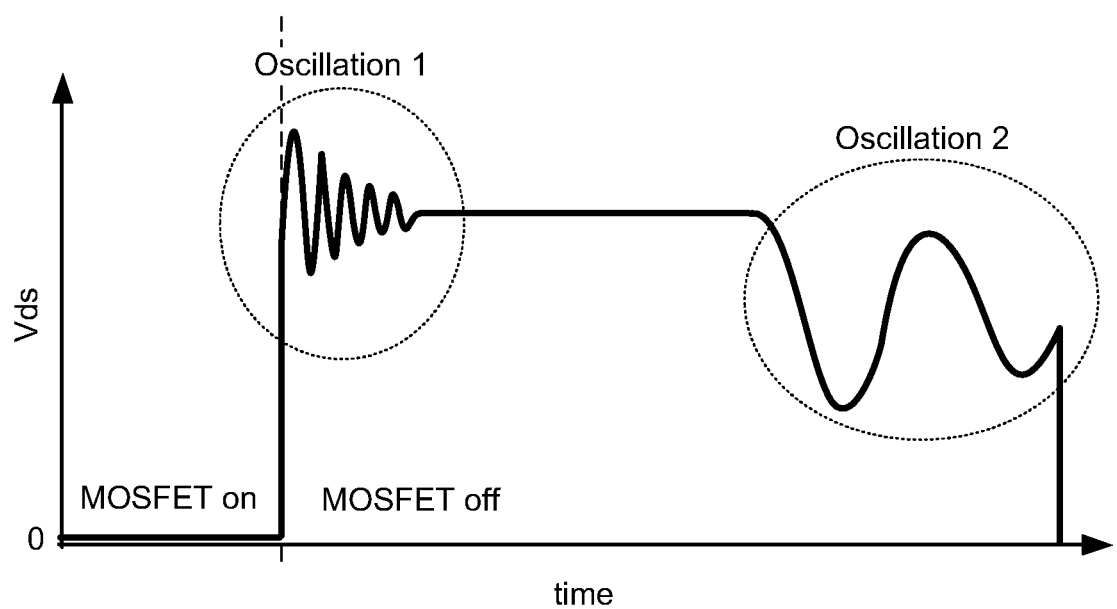
FIG. 1B is a graph showing a waveform of a drain-source voltage (Vds) across a MOSFET of the conventional flyback converter where two resonant oscillations can be observed.
Figure 1C:
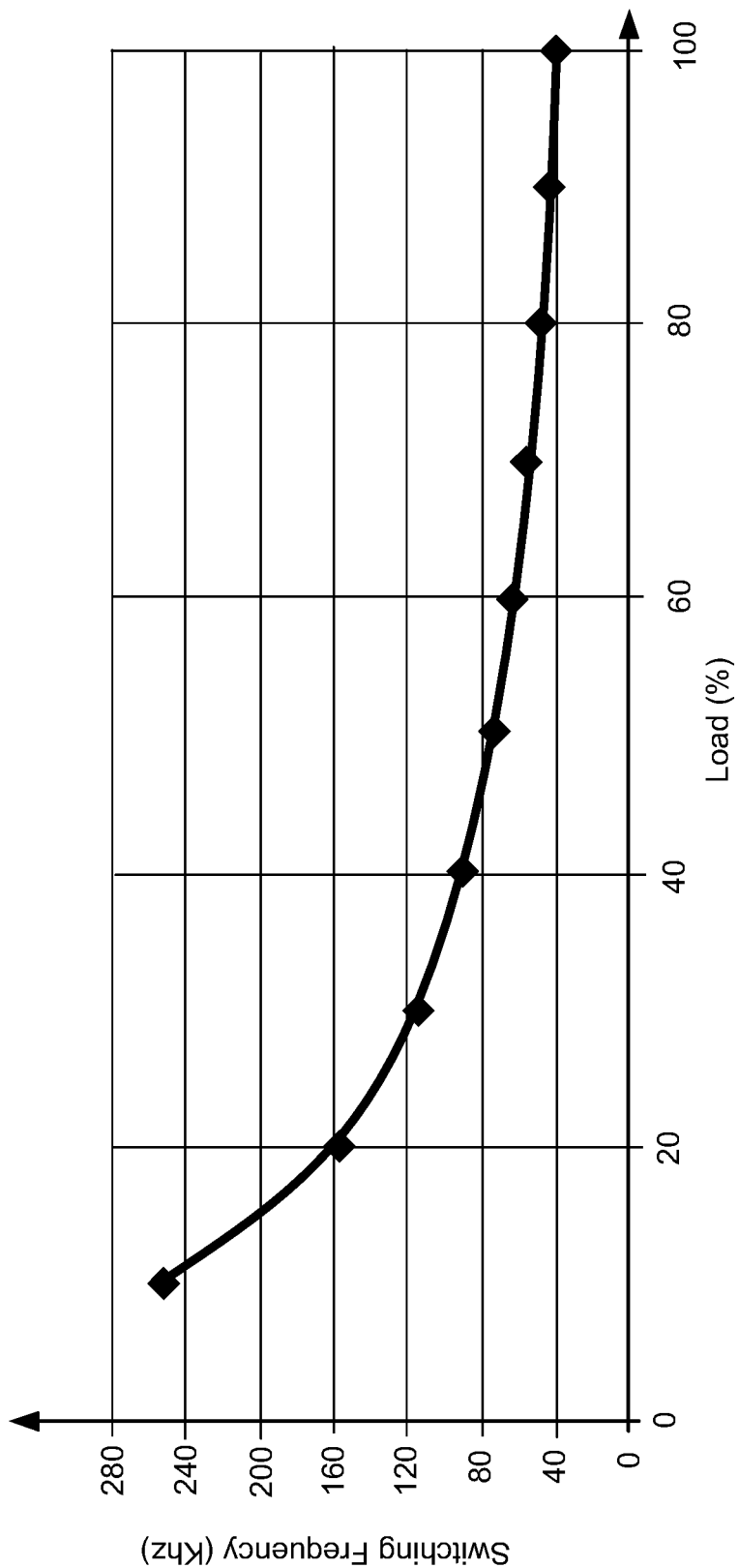
FIG. 1C shows the switching frequency versus load current or power for a conventional QR flyback converter operating in a free running mode.
Figure 2A:
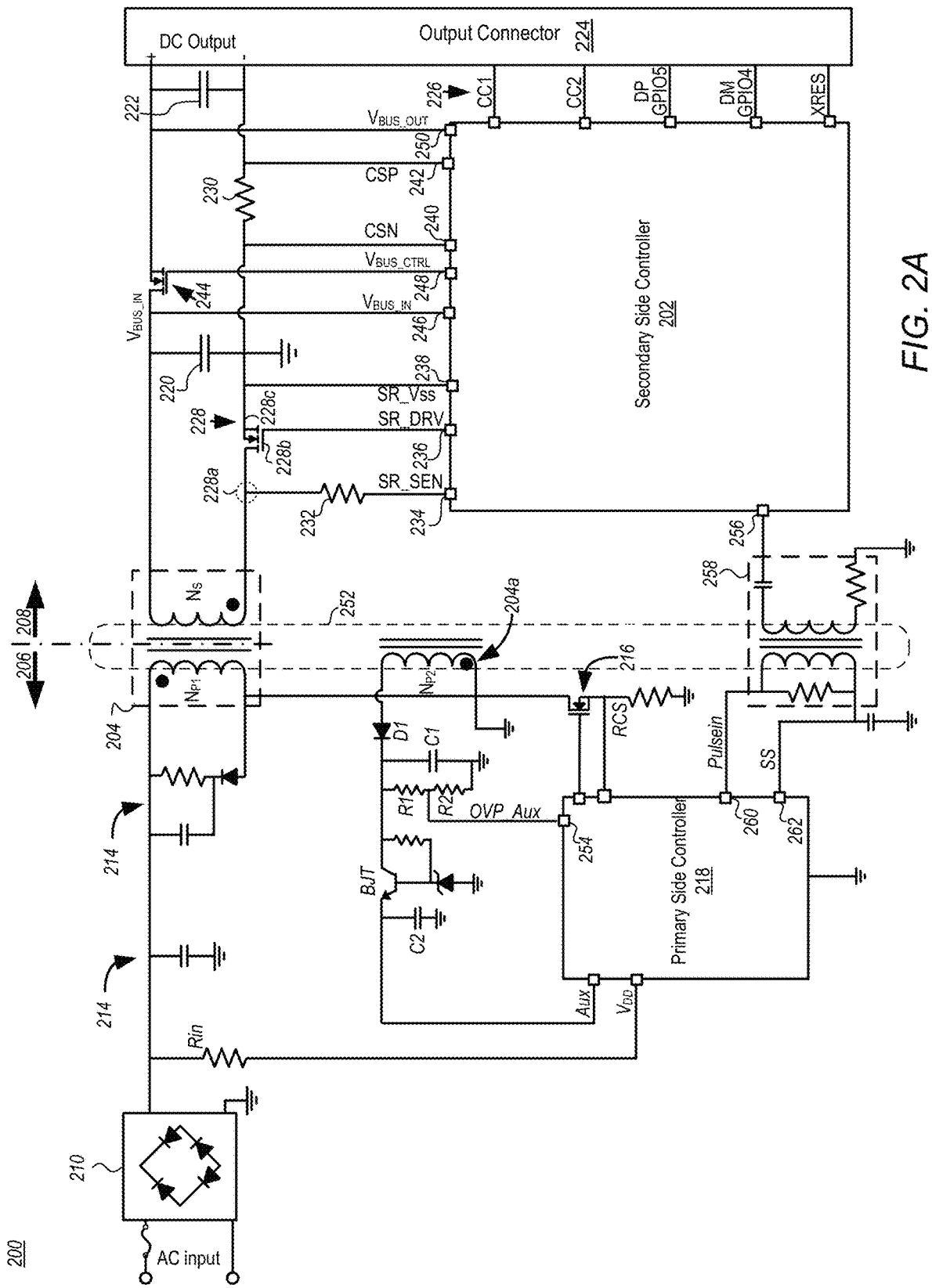
FIG. 2A is a schematic block diagram depicting an embodiment of a secondary-side controlled QR flyback converter operable to use a programmable valley algorithm in accordance with the present disclosure.

An embodiment of a QR flyback converter including a secondary-side controller in accordance with the present disclosure will now be described with reference to FIGS. 2A and 2B. FIG. 2A is a schematic block diagram of a QR flyback converter 200 including a secondary-side controller 202 operable to execute a programmable valley algorithm detect valleys of a resonant waveform at a drain node of a power switch (PS) on a primary side of the converter, and to increment, decrement or leave unchanged the valley at which the PS signal is cycled to increase efficiency of the converter.

Referring to FIG. 2A, the QR flyback converter 200 generally includes a transformer 204 having a first winding ($N_P$) on a primary side 206 electrically connected or coupled to an AC input, and a secondary winding ($N_S$) on a secondary side 208 coupled to a DC output. The AC input is coupled to a first terminal the transformer 204 through a bridge rectifier 210, one or more input filters 212, and a snubber 214. A main or power switch (PS 216), such as a primary field effect transistor (PR_FET), has a first or drain node coupled to the second terminal of the transformer 204, a gate node coupled to a primary side controller 218, and a third or source node coupled to the primary side controller and, through a current sensing element, such as a resistive element (RCS) to ground to sense a primary side current (I_primary) flowing through the primary winding when the PS 216 is closed or conducting. Generally, as in the embodiment shown, the primary side controller 218 is further coupled to the first terminal of the transformer 204 through a resistive element (Rin) to receive a voltage or signal equal or proportional to the rectified AC input voltage.

On the secondary side 208 the QR flyback converter 200 includes a filter capacitor 220 coupled between a third terminal of the transformer 204 and an electrical ground or ground terminal, and an output capacitor 222 coupled between the third terminal and electrical ground provide a DC output voltage to an output interface or connector 224. Generally, as in the embodiment shown the output connector 224 is further coupled to the secondary side controller 202 through a number of communication channels 226 to support various charging protocols. Suitable output connectors 224 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus C (USB-C) compatible connector where the QR flyback converter 200 is compliant with the USB protocol to provide a DC output voltage of about 3.3 VDC to about 21.5 VDC at a current of from about 0 to about 5 amps (A).

Generally, the QR flyback converter 200 further includes on the secondary side 208 a synchronous rectifier field effect transistor (SR_FET 228) coupled between the transformer 204 and through a current sensing or shunt resistor 230 to a negative terminal of the DC output. The SR_FET 228 includes a drain node 228a coupled to the transformer 204 and, through a resistor 232, to an SR sense pin (SR_SEN 228) of the secondary side controller 202 to sense a voltage on the drain of the SR_FET; a gate node 228b coupled to an SR gate drive pin (SR_DRV 236) of the secondary side controller to drive or control the SR_FET; and a source node 228c coupled to the DC output, and to the secondary side controller through a SR-Vss, ground voltage level pin (SR-Vss 238). A first node of the shunt resistor 230 is coupled to a current sensing negative pin (CSN 240) of the of the secondary side controller 202, and a second node coupled to the negative terminal of the DC output and to a current sensing positive pin (CSP 242), to enable the secondary side controller sense the current flow from the QR flyback converter 200.

Optionally, as in the embodiment shown, the secondary side further includes an additional or secondary switch (SS) 244, such as a NFET, coupled between the transformer 204 and a positive terminal of the DC output to enable to the secondary side controller 202 to turn off the DC output to protect against over voltage and/or under voltage conditions. The SS 244 includes a source node coupled to a voltage_bus_in pin ($V_{BUS\_IN}$ 246) of the secondary side controller 202; a gate node coupled to a voltage bus control pin ($V_{BUS\_CTRL}$) 248 to drive or control the SS; and a drain node coupled to a voltage bus out pin ($V_{BUS\_OUT}$) 250 and to the positive terminal of the DC output.

As shown in FIG. 2A, the QR flyback converter 200 further includes an isolation circuit or barrier 252 to electrically isolate the secondary side 208 from the high AC input voltage present on the primary side 206. Because the transformer 204 is a step down transformer it is generally considered part of the isolation barrier 252.

The isolation barrier also includes an auxiliary coil of the transformer 204, which functions as a fly-back step-down transformer 204a to provide power to primary side controller 218 via an Aux pin. The step-down transformer 204a along with a diode D1 followed by capacitor C1 to ground stores the stepped-down-voltage which is then clipped by a bipolar junction transistor (BJT) structure and then coupled to the Aux pin. This additional circuit helps to reduce total power consumption of the AC-DC converter 200 as the primary side controller 218 is supplied through the Aux pin instead of by a separate power supply through another pin coupled to the first terminal 204a on the primary side 206 of the transformer 204 through Rin. A resistor divider R1, R2, connected to an over voltage protection (OVP)_AUX pin 254 of primary side controller 218 is used to sense a reflected voltage of VBUS_IN on the secondary side 208 via the step-down transformer 204a to disable PS 216 if an over voltage condition is detected.

Additionally where, as in the embodiment shown, the QR flyback converter 200 uses a pulse width modulation (PWM) signal provided to the primary side controller 218 from a PWM drive pin 256 on the secondary side controller 202, the isolation barrier 252 can further include a pulse transformer 258 coupled between the PWM drive pin and a pulse_in pin 260 and a soft-start (SS) pin 262 of the primary side controller. The secondary side controller 202 controls a width of the PWM signal based on power required on the DC output, and executes a programmable valley algorithm to determine on which one of a number of valleys detected in the resonant waveform on the drain node of the PS 216 to turn on the PS or start a switch cycle to optimize or increase efficiency of the QR flyback converter 200.

In certain embodiments, such as that shown, the primary side controller 218 and secondary side controller 202 are realized or implemented as a number of ICs packaged in a single IC package.

Figure 2B:
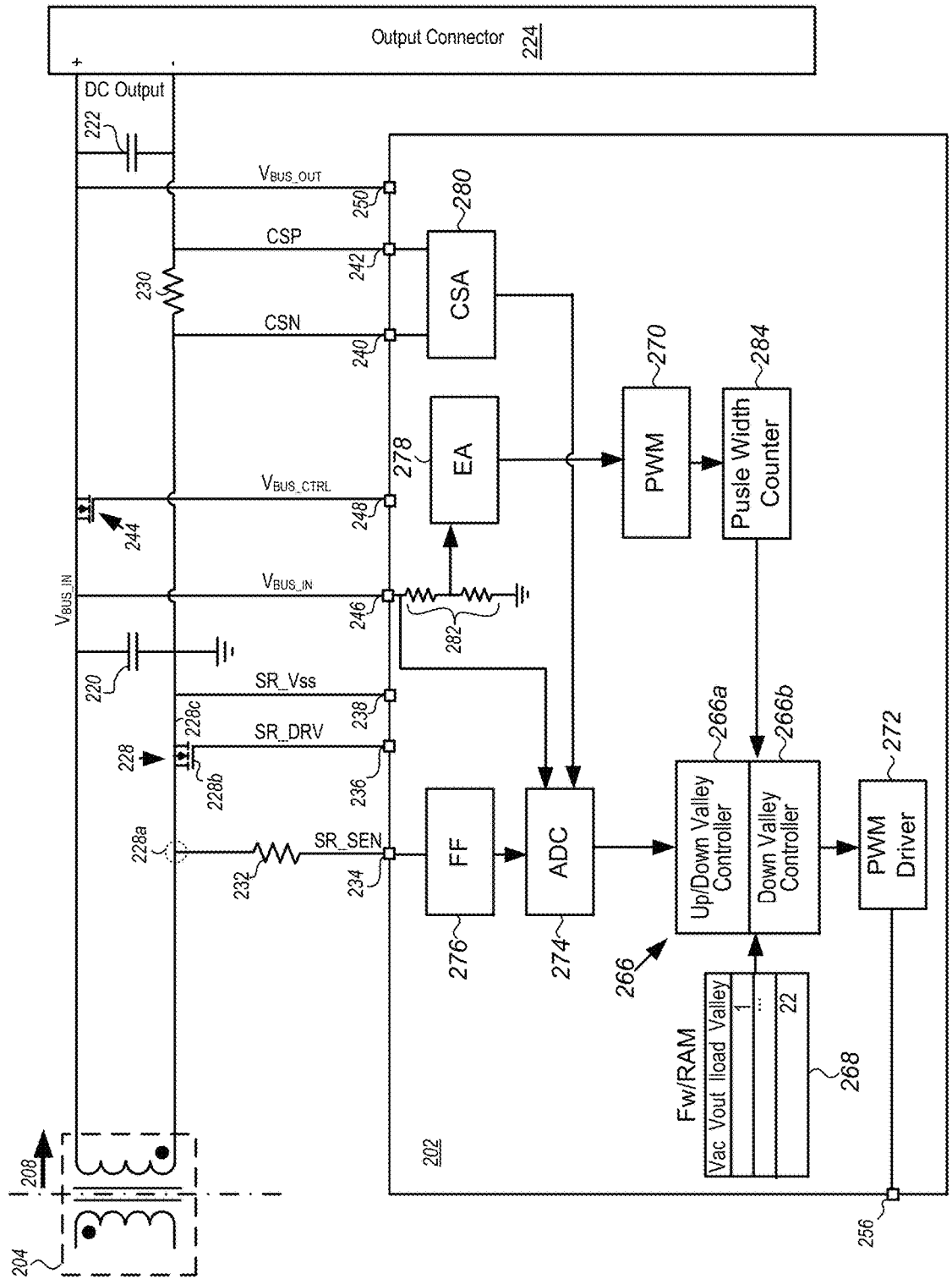
FIG. 2B is a detailed block diagram depicting an embodiment of the secondary-side controller of FIG. 2A including a valley controller and look-up table for implementing a programmable valley algorithm in accordance with the present disclosure.

FIG. 2B is a detailed block diagram depicting an embodiment of the secondary-side controller 202 of FIG. 2A. Referring to FIG. 2B, the secondary-side controller 202 includes a valley-controller 266 coupled to a look-up-table 268, a pulse width modulator (PWM 270), a PWM driver 272, an analog to digital converter (ADC 274), a number of feedforward (FF) blocks 276, an error amplifier (EA 278) and a current sensing amplifier (CSA 280), coupled as shown.

The FF blocks 276 are coupled to the SR_SEN pin 234 and can include a valley detector, zero-crossing detector and line FF circuits operable to couple a number of analog signals, including a valley detection signal to the ADC 274. In one embodiment, the valley detector is implemented as a peak voltage detector (VPD), since a valley in the resonant voltage applied to the primary of the transformer 204 will appears as a peak voltage on the secondary.

The CSA 280 is coupled across the shunt resistor 230 through the CSN and CSP pins 240, 242, and is configured or operable to provide a current signal ($I_{Load}$) to the ADC 274.

The EA 278 is coupled to the $V_{BUS\_IN}$ pin 246 through a voltage divider 282, and is configured or operable to receive the $V_{BUS\_IN}$ voltage and generate an EA output voltage signal to the PWM 270. The PWM 270 is configured or operable to generate and couple to the valley-controller 266 a PWM signal to control a time or duration during which the PS is 'ON' during a switching cycle based on the EA output voltage signal. In some embodiments, such as that shown, the PWM 270 is coupled to the valley-controller 266 through a pulse width counter 284 to detect a pulse width of the PWM signal coupled from the PWM to the PWM driver 272.

The ADC 274 is coupled to the FF blocks 276, the CSA 280 and to the $V_{BUS\_IN}$ pin 246. The ADC 274 is operable to receive a number of analog signals and voltages, including input AC voltage ($V_{AC}$), the current signal ($I_{Load}$) and the $V_{BUS\_IN}$ voltage, and to generate and couple to the valley-controller 266 a number of digital signals based on the analog signals received.

The valley-controller 266 is coupled to the ADC 274, the lookup table 268, the PWM 270 and the PWM driver 272, which is in signal communication with the PS 216 through the PWM drive pin 256. The valley-controller 266 is configured or operable to receive the digital signals from the ADC 274, and, based on the digital signals received, determine from values stored in the look-up-table 268 at which valley of the plurality of valleys to couple a PWM signal from the PWM 270 to the PWM driver 272. The look-up-table 268, which can be implemented in firmware or other non-volatile memory, can store values for an AC input voltage ($V_{AC}$) to the QR flyback converter 200, a required or desired DC output voltage ($V_{OUT}$), supported or permissible load currents ($I_{LOAD}$) and a numeric value identifying at which one of a number of valleys, $1^{st}$, $2^{nd}$, $3^{rd}$, etc . . . , detected in the resonant waveform on the drain node of the PS 216 to turn on the PS or start a switch cycle to optimize or increase efficiency of the converter.

In some embodiments, such as that shown, the valley-controller 266 includes two separate controllers, including a first or up/down valley-controller 266a, which may be implemented in hardware or software, and a second or down valley-controller 266b implemented in hardware. Generally, it is the up/down valley-controller 266a that is configured or operable to receive the digital signals from the ADC 274, and, based on the digital signals received, determine from values stored in the look-up-table 268 at which valley of the plurality of valleys to couple a PWM signal from the PWM 270 to the PWM driver 272. The down valley-controller 266b is configured or operable to, when the pulse width increases by a specified amount or count as indicated by the pulse width counter 284, decrement by one or more valleys the valley at which the PWM signal is coupled from the PWM 270 to the PWM driver 272. The down-valley controller 266b is implemented through hardware to support quick power delivery for increased power requirement.

Figure 3:
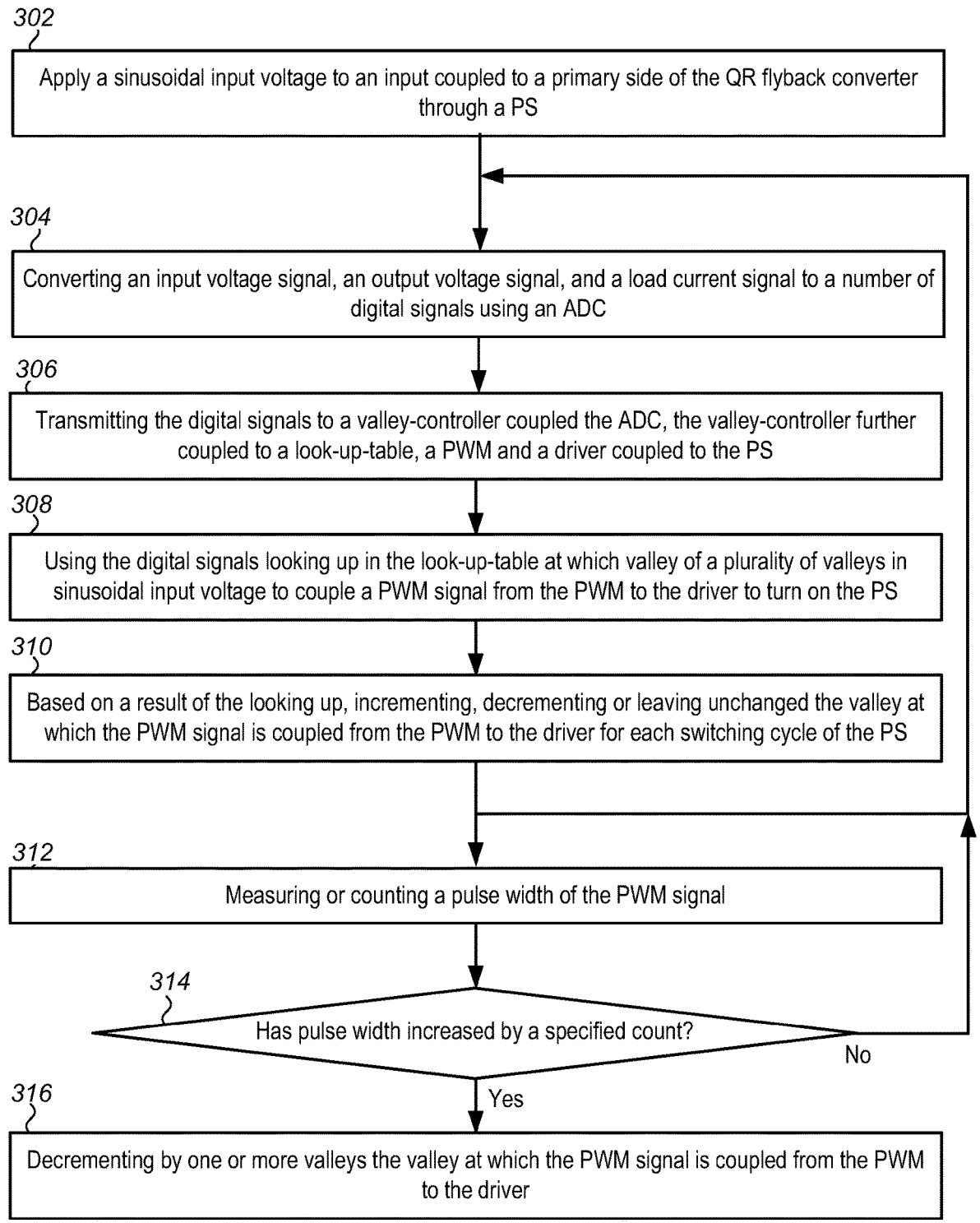
FIG. 3 a flowchart illustrating an embodiment of a method for operating a secondary-side controlled QR flyback converter using a programmable valley algorithm in accordance with the present disclosure.

A method of operating a QR flyback converter having a secondary side controller including an IC having a single SR-SNS pin through which the IC is coupled to the drain of a SR through a voltage divider will now be described with reference to the flowchart of FIG. 3. FIG. 3 a flowchart illustrating an embodiment of a method for operating a secondary-side controlled QR flyback converter using a programmable valley algorithm in accordance with the present disclosure. Referring to FIG. 3 the method begins with applying a sinusoidal input voltage to a primary side of the QR flyback converter (step 302). An input voltage signal, an output voltage signal, and a load current signal are then coupled to an ADC in the secondary-side-controller and converted into a number of digital signals using the ADC (step 304). Next, the digital signals are transmitted to a valley-controller in the secondary-side-controller coupled the ADC (step 306). As described above, the valley-controller is further coupled to a look-up-table, a PWM and a driver coupled to the PS. Using the digital signals the valley-controller looks up in the look-up-table at which valley of the number of valleys in the sinusoidal input voltage to couple a PWM signal from the PWM to the driver to turn on the PS (step 308). Based on a result of the looking up, the valley at which the PWM signal is coupled from the PWM to the driver of the power switch is incremented, decremented or left unchanged (step 310). The process then repeats for each switching cycle.

Optionally, the method may further include measuring or counting a pulse width of the PWM signal (step 312), and, when the pulse width increases by a specified count (step 314), decrementing by one or more valleys the valley at which the PWM signal is coupled from the PWM to the driver (step 316). Preferably, as described above this decrementing is accomplished using a down-valley-controller in the valley-controller, which is implemented in hardware to support quick changes in switching frequency by decrementing the valley used for switching for an increased power requirement.

Figure 4:
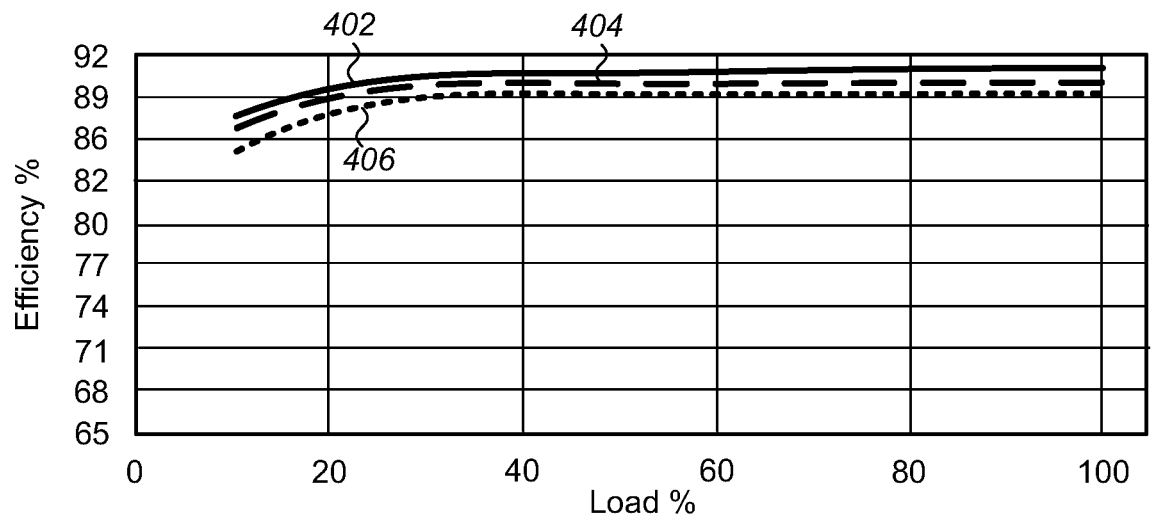
FIG. 4 is a graph of efficiency versus load for a secondary-side controlled QR flyback converter operated using a programmable valley algorithm in accordance with the present disclosure.

FIG. 4 is a graph of efficiency versus load for a number of output voltages for a secondary-side controlled QR flyback converter operated using a programmable valley algorithm in accordance with the present disclosure. In particular, line 402 illustrates the efficiency versus load for an output voltage of 9 VDC; line 404 illustrates the efficiency versus load for an output voltage of 5V DC; and line 406 illustrates the efficiency versus load for an output voltage of 3.3V DC. Referring to FIG. 4 it is noted that for all three output voltages efficiency is greater than 89% for loads over about 40%, and for loads of about 10% the lowest efficiency, for an output voltage of 3.3V DC the efficiency is still greater than about 84%.

FIG. 5 is a graph of efficiency versus load for a conventional QR flyback converter, i.e., one lacking a controller using a programmable valley algorithm, and operated in a conventional manner. Referring to FIG. 5 it is noted that for an output voltage of 9V DC, illustrated by line 502, that the efficiency versus load decreases from a high of about 89% at 100% load to a low of about 84% at 10% load. At an output voltage of 5V DC, illustrated by line 504, that the efficiency versus load decreases from a high of about 88% at 100% load to a low of about 87% at 10% load, and an output voltage of 3.3V DC, illustrated by line 506, that the efficiency versus load decreases from a high of about 83% at 100% load to a low of about 74% at 10% load.

Thus, a secondary side controller for a QR flyback converter with programmable valley algorithm and methods of operating the same to provide high efficiencies across a wide range of output voltages and output loads have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A secondary-side-controller for a quasi-resonant (QR) flyback converter, the secondary-side-controller comprising:
    a driver configured to control a power-switch (PS) on a primary side of the QR flyback converter, the driver operable to cause turn-on of the PS when a sinusoidal input voltage to the QR flyback converter is at one of a plurality of valleys;
    an analog to digital converter (ADC) coupled to receive an input voltage signal, an output voltage signal, and a load current signal, the ADC operable to generate a number of digital signals based thereon; and
    a valley-controller coupled to the driver, the ADC, a look-up-table and to a pulse width modulator (PWM), the valley-controller operable to receive the number of digital signals from the ADC and based on the number of digital signals received determine from values stored in the look-up-table at which valley of the plurality of valleys to couple a PWM signal from the PWM to the driver.

2. The secondary-side-controller of claim 1 wherein the valley-controller comprises an up/down-valley-controller operable to increment, decrement or leave unchanged the valley at which the PWM signal is coupled from the PWM to the driver for each switching cycle of the power switch (PS).

3. The secondary-side-controller of claim 2 wherein the up/down-valley-controller is operable to increment or decrement the valley at which the PWM signal is coupled from the PWM to the driver by a single valley for each switching cycle.

4. The secondary-side-controller of claim 2 wherein the up/down-valley-controller is implemented using a program stored in a memory in the secondary-side-controller.

5. The secondary-side-controller of claim 2 further comprising a pulse width counter through which the PWM is coupled to the valley-controller to detect a pulse width of the PWM signal coupled from the PWM to the driver.

6. The secondary-side-controller of claim 5 wherein the valley-controller further comprises a down-valley-controller operable to, when the pulse width increases by a specified count, decrement by one or more valleys the valley at which the PWM signal is coupled from the PWM to the driver.

7. The secondary-side-controller of claim 1 wherein the look-up-table is stored in memory in the secondary-side-controller, and wherein the values stored in the look-up-table can be selected based on one or more of available input power, output power requirements, and components of the QR flyback converter.

8. The secondary-side-controller of claim 1 further comprising a number of feedforward (FF) blocks through which the input voltage signal is coupled to the ADC.

9. The secondary-side-controller of claim 8 wherein the number of FF blocks comprise a peak voltage detector to generate a valley detection signal that is coupled to the valley controller through the ADC.

10. The secondary-side-controller of claim 1 further comprising a current sense amplifier (CSA) to generate the load current signal coupled to the valley-controller through the ADC.

11. The secondary-side-controller of claim 10 further comprising an error amplifier (EA) coupled to receive the output voltage signal, and provide an EA output signal to the PWM used to determine a pulse width of the PWM signal generated thereby.

12. A system comprising:
    a transformer including a primary side coupled to receive a sinusoidal input voltage and having a power switch (PS) wherein the sinusoidal input voltage is coupled between the primary side and the PS, and a secondary side coupled to an output port to provide an output voltage thereto;
    a primary-side-controller operable to control the PS; and
    a secondary-side-controller including:
        a driver configured to control the primary-side-controller, the driver operable to provide a drive signal to cause the primary-side-controller to turn on the PS when the sinusoidal input voltage is at one of a plurality of valleys;
        an analog to digital converter (ADC) coupled to receive an input voltage signal, an output voltage signal, and a load current signal, the ADC operable to generate a number of digital signals based thereon; and
        a valley-controller coupled to the driver, the ADC, a look-up-table and to a pulse width modulator (PWM), the valley-controller operable to receive the number of digital signals from the ADC and based on the number of digital signals received determine from values stored in the look-up-table at which valley of the plurality of valleys to couple a PWM signal from the PWM to the driver.

13. The system of claim 12 wherein the valley-controller comprises an up/down-valley-controller operable to increment, decrement or leave unchanged the valley at which the PWM signal is coupled from the PWM to the driver for each switching cycle of the power switch (PS).

14. The system of claim 13 wherein the up/down-valley-controller is operable to increment or decrement the valley at which the PWM signal is coupled from the PWM to the driver by a single valley for each switching cycle.

15. The system of claim 13 wherein the up/down-valley-controller is implemented using a program stored in a memory in the secondary-side-controller.

16. The system of claim 13 further comprising a pulse width counter through which the PWM is coupled to the valley-controller to detect a pulse width of the PWM signal coupled from the PWM to the driver.

17. The system of claim 16 wherein the valley-controller further comprises a down-valley-controller operable to, when the pulse width increases by a specified count, decrement by one or more valleys the valley at which the PWM signal is coupled from the PWM to the driver.

18. The system of claim 12 wherein the output port comprises a Universal Serial Bus Type C (USB-C) compatible connector.

19. A method of operating a quasi-resonant (QR) flyback converter comprising:
    applying a sinusoidal input voltage to an input coupled to a primary side of the QR flyback converter by a power-switch (PS);

converting an input voltage signal, an output voltage signal, and a load current signal to a number of digital signals using an analog to digital converter (ADC);

transmitting the number of digital signals to a valley-controller coupled to the ADC, the valley-controller further coupled to a look-up-table, a pulse width modulator (PWM) and a driver coupled to the PS;

using the number of digital signals, looking up in the look-up-table at which valley of a plurality of valleys in the sinusoidal input voltage to couple a PWM signal from the PWM to the driver to turn on the PS; and based on a result of the looking up, incrementing, decrementing or leaving unchanged the valley at which the PWM signal is coupled from the PWM to the driver for each switching cycle of the PS.

20. The method of claim 19 wherein further comprising detecting a pulse width of the PWM signal coupled from the PWM to the driver, and if the pulse width increases by a specified count, decrementing by one or more valleys the valley at which the PWM signal is coupled from the PWM to the driver.

\* \* \* \* \*